Feb. 2, 1954     H. H. CLAYTON ET AL     2,668,281
BULB SOCKET ASSEMBLY EMBODYING MEANS FOR
FASTENING THE SAME IN A PERFORATED PANEL
Filed Jan. 8, 1952
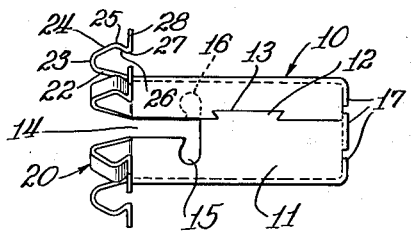
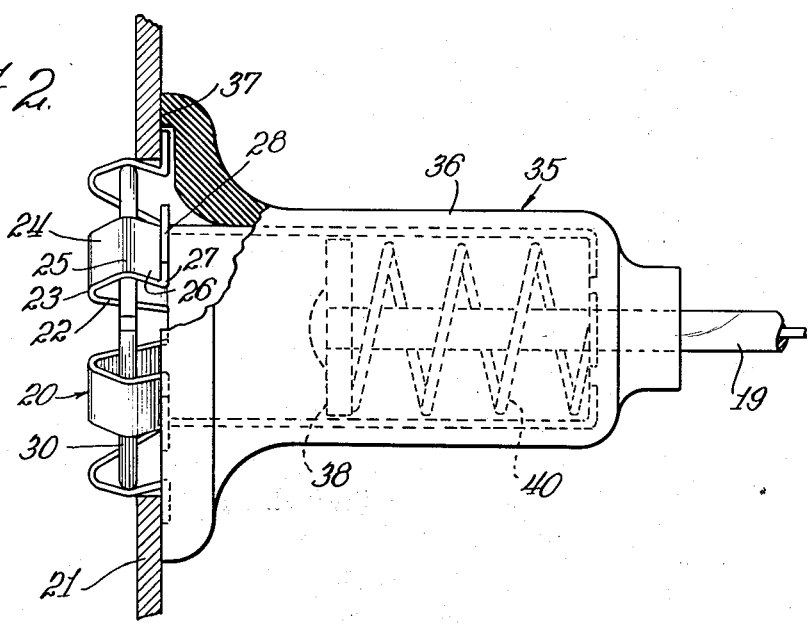
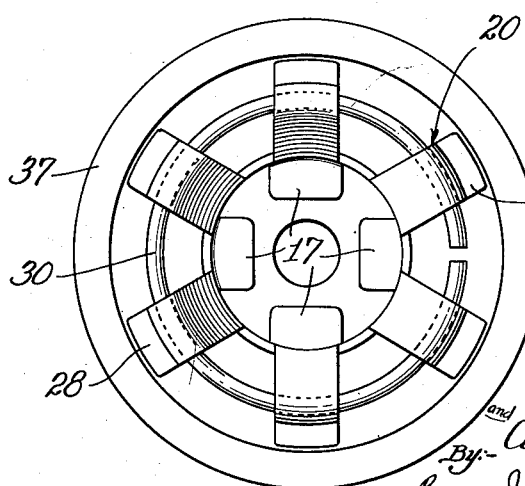
INVENTORS:
Harold H. Clayton
and Arlo D. Satterthwaite
By: Brown, Jackson, Boettcher & Dienner Att'ys Patented Feb. 2, 1954

2,668,281

UNITED STATES PATENT OFFICE 2,668,281

BULB SOCKET ASSEMBLY EMBODYING MEANS FOR FASTENING THE SAME IN A PERFORATED PANEL

Harold H. Clayton and Arlo D. Satterthwaite, Logansport, Ind., assignors to Essex Wire Corporation, Logansport, Ind., a corporation of Indiana Application January 8, 1952, Serial No. 265,398

4 Claims. (Cl. 339—128)

Our present invention is concerned with a new and improved socket assembly for holding incandescent light bulbs or the like.

More particularly our invention is directed to a new, improved and simplified socket assembly of a type adapted to support and hold a small incandescent light bulb, such as an automobile dashboard, head or tail light, wherein the socket embodies improved means for fastening the same to a mounting panel member with resilient snap-in action.

In the mounting of automobile tail lights, head lights, dash lights or like related small light bulbs, it is often desirable to have the supporting socket members in condition for ready removal from the mounting panel so that the light bulb more conveniently may be removed for replacement by simultaneously removing the supporting socket therewith. Additionally, it is desirable to have a substantially dust free connection between the socket and mounting panel and between the socket and the electrical lead which supplies the necessary electrical current for lighting the bulb, to prevent road dirt and dust from interferring with the functioning of the bulb. This dust problem is especially important as related to tail and head-light mountings for automobiles, inasmuch as road dirt and dust prove detrimental to the light reflectors in which such bulbs are mounted. The light bulb, of course, should be readily removable from the socket to facilitate quick replacement.

To this end we have invented a new and improved socket assembly wherein a light bulb may be quickly installed in the socket by bayonet slot connective means and wherein a surrounding cap of rubber or like pliant material covers the socket in a manner suitable to provide a dust tight junction between itself and the panel in which such is mounted and between itself and the incoming electrical supply conductor; the socket being provided with a new and improved snap-in attachment means.

The main object of our invention is to disclose a new and improved bulb socket assembly for mounting small incandescent light bulbs, or the like, which embodies a new and simplified means for mounting such quickly and easily to a supporting panel or the like.

A further object of our invention is to provide a socket assembly having a surrounding rubber or like pliant materialed dust cap or mantel whereby dust tight junctions are provided between the incoming electrical supply leads and the mounting panel to which such socket assembly is mounted.

A still further object of our invention is to display the features of a new and improved snap-in connective means for mounting a holding socket for a small incandescent light bulb within a mounting panel aperture by a snap-in action; the snap-in connective means embodying certain new and improved features which augment its ability to tightly hold the socket to the mounting panel without impairing its feature of ready removal therefrom.

The above and further objects and features of our invention will be recognized by those familiar with the art from the following description and specification thereof and from the accompanying drawings.

In the drawings:

Figure 1 is a side elevational view demonstrating the features of the socket casing of our socket assembly;

Figure 2 is a side elevational view, similar to Figure 1, showing the socket casing of that figure assembled with a pliant dust cap and retaining spring means of our socket assembly; and Figure 3 is an end elevational view of the socket assembly demonstrated in Figure 2.

Turning now to the drawings, it will be recognized that we have therein illustrated, in Figure 1 in particular, a socket casing indicated generally by numeral 10. The socket casing 10 comprises a substantially cylindrical metal barrel portion 11 rolled from a suitable length of sheet metal, such as cold rolled steel or the like. A dove tail male projection 12 is formed along one longitudinal edge of the substantially rectangular blank of metal utilized to form the rolled barrel portion 11, and such is matingly received in a suitable female opening 13, to form a dove tail locking means for securing the abutting edges of the barrel together. The barrel portion is also provided with a pair of opposite and registeringly aligned slotted openings 14 which comprise an entry section for bayonet locking openings 15 and 16. In this connection it will be observed that locking opening 16 is directed oppositely to that of the opening 15, so as to provide means for engaging suitable post projections, or the like, provided on small incandescent light bulbs of the class used with bayonet slot connectors, as we have illustrated herein. The right hand end of the barrel section 11, as viewed in Figure 1, is provided with a plurality of inwardly turned lugs 17, 17 to partially enclose that end of the barrel section, but providing a central opening for the reception therethrough of a suitable insulated electrical conductor 19 according to conventional practice. At the left hand end of the barrel section 11 are formed a plurality of snap-in fingers 20, 20 which constitute our improved means for mounting the socket assembly of our invention in a mounting panel 21 by snap-in engagment, in the manner shown in Figure 2 of the drawings.

In the particular embodiment of our socket assembly illustrated herein, it will be noted that six of the snap-in fingers 20 are provided in symmetrically arranged positions about the barrel portion 11 of the casing member. Since each of the snap-in fingers 20 is formed in a like manner, a description of one will suffice for all, it being understood that such are all integrally formed with the barrel section 11 by a suitable stamping machine, or the like, of a conventional design, adapted to perform the necessary bending and rolling operations required to accomplish the manufacture of a socket casing as we specify herein.

Each of the snap-in fingers 20 comprises a looped over longitudinal extension of the barrel section 11 having immediate juncture with the barrel through an inner wall portion 22. It will be observed that the inner wall portion 22 is bent outwardly at a slight angle to diverge slightly away from the longitudinal axis of the barrel section and that such is reentrantly turned over at its outer end, thereby reversing the direction of the finger's extension, to form a curvilinear end wall portion 23. The end wall 23, bearing the reentrant curved configuration, extends in a reverse direction to merge with a short planar intermediate wall portion 24 diverging angularly outward from the inner wall 22. The intermediate wall portion 24 in turn, is bent angularly inward at 25 to merge with a planar panel engaging portion 26 which is terminated at its innermost extension by a reentrantly formed detent 27 designed to lockingly engage with the mounting panel 21, in a manner to be described later herein. Further the free end of each snap-in finger is turned outwardly from the detent bend 27 to form a stop section 28. It will be observed that the stop sections of the several fingers 20 lie in substantially true transverse relation to the longitudinal axis of the barrel section 11 and extend radially outward beyond the radial limits of the other portions of the snap-in fingers. Further it will be recognized that the several stop sections 28 are so designed as to lie in coplanar relation transversely of the cylindrical barrel section 11 for purposes of limiting the insertion of the socket assembly into the mounting panel 21, as will be appreciated upon observation of Figure 2 in particular.

Since the materials from which the socket casing and snap-in fingers are made is preferably metal of somewhat resilient nature, but which nevertheless is subject to fatigue after repeated flexing, we have found that improved operation of the snap-in engagement function of the snap fingers is gained by providing a substantially annular open ended spring member 30, shown as a single turn open ring having separated ends which may be arranged in coplanar or overlapping relation, as desired, to provide compressive flexing action therefor. Spring 30 is mounted through the loops of the several fingers, as shown in Figure 2 of the drawings in particular. It will be recognized that the inside of the bends 25, intermediate the wall portions 24 and the panel engaging portions 26 of the stop fingers, provide a convenient locating means for maintaining the annular spring member 30 in a plane substantially transverse of the longitudinal axis of the socket casing 10, with such bend portions 25 cooperating to maintain the spring 30 in a desired operating alignment.

Having described the elements and features of the socket casing and snap-in fingers heretofore, it will be recognized that such are assembled wtih a pliant rubber dust cap 35, as illustrated in Figures 2 and 3 of the drawings, with the cylindrical barrel portion of the socket casing 10 being received coaxially and concentrically within a substantially cylindrical sleeve portion 36 of the dust cap; such being inserted therein a sufficient distance to permit a marginal lip 37 of the cap to overlap the outwardly extending ends of the finger stop sections 28. Thus when our socket assembly is inserted in the mounting panel, such as 21 illustrated in Figure 2 of the drawings, compression of the marginal lip portion 37 of the dust cap takes place to provide a very tight and satisfactory dust seal with the mounting panel 21.

Use and operation

Utility of the device which we have described hereabove is obvious and will be readily appreciated by one cognizant with this particular art. In particular it will be noted that a conventional insulated contact plate 38 and the electrical conductor 19 are coaxially mounted within the interior of the barrel portion 11 of the socket casing 10 and that the contact plate is resiliently held for coaxial movement within the socket casing and assisted into contact making engagement with a conventional small incandescent light bulb, or the like (not illustrated), by means of a compression coil spring 40 mounted between the plate 38 and lugs 17 of the socket casing 10 in a conventional manner. The insertion of our socket assembly in an opening formed therefor in a mounting panel, such as 21 illustrated, brings about a new and improved functioning of the snap-in fingers which distinguishes our present socket assembly from those heretofore known in the art. It will be appreciated that as the fingers 20 are inserted through the mounting panel opening, such are flexed radially inward causing radial compression of the annular spring member 30. As the thrusting insertion of the socket assembly is continued, the panel engaging detents 27 of the several snap-in fingers eventually engage the peripheral limits of the mounting panel opening. Tight fitting engagement is maintained between the detents 27 and the panel by virtue of first, the resilient nature of the flexible snap-in fingers which tend to resist their inward radial compression caused by the insertion of the socket into the panel, and secondly, by the outward radial thrust exerted by the annular spring member 30. It will therefore be appreciated that repeated insertion and removal of our socket assembly, utilizing the spring loaded snap-in finger arrangement as we have herein described, is not subject to loss of resiliency in its snap-in fingers as has been heretofore prevalent in the art. This particular noteworthy feature is largely due to the provision of the particular configuration of the snap-in fingers, which provides the inwardly recessed detents 27, and by virtue of the provision or combination therewith of the annular spring member 30 which, while being sufficiently compressible to permit entry of the snap-in fingers 20 in the mounting panel opening, is likewise conversely capable of quick resilient return to its normal open condition to provide radial outward thrust inwardly of the several stop fingers thereby to maintain such in a desired radially outward expanded condition to grip the edge of the mounting panel opening.

While we have herein described and illustrated one form in which the features and teachings of our invention may occur, it will be appreciated that several modifications, changes and substitutions of equivalents may be made therein without departing from the spirit and scope of our invention. Therefore, we do not wish to be limited to the specific details of the embodiment herein set forth, except as may appear in the following appended claims.

We claim:

1. In a bulb socket assembly of the class described, a metal bulb receiving casing comprising a cylindrical barrel portion having bayonet slot connector openings formed on opposite sides and inwardly of one end thereof for lockingly engaging the socket end of a light bulb inserted therein, a plurality of symmetrically spaced, resilient snap-in finger members formed integrally with said barrel portion and extending outwardly of the said one end thereof, each of said finger members comprising a reentrantly looped over extension of said barrel portion, with the looped over portion thereof lying radially outward of the diametrical limits of said barrel portion and having the free end thereof terminating in a planar stop section extending radially outward and transversely of the longitudinal axis of said barrel portion; an inwardly recessed detent portion formed intermediate said finger's looped over portion and said stop section thereof for lockingly engaging the periphery of a mounting panel aperture into which said socket assembly is to be inserted; and an annular spring member mounted through the loop of said fingers to bias said looped over portions thereof radially outward to maintain such spaced outwardly from said barrel portion and to supplement the resilient gripping action of said fingers when the same are inserted into the mounting panel aperture; said stop sections of said fingers serving to limit the insertion of said socket into the mounting panel.

2. A bulb socket assembly of the class described for ready attachment and removal from a supporting panel having a circular aperture for receiving such, comprising in combination, a cylindrical metal casing having one open bulb receiving end and a substantially closed opposite end through which an electrical supply conductor is received, a plurality of symmetrically spaced snap-in fastener fingers projecting divergingly and radially outward of the open end of said casing, each of said fingers being an integral extension of said casing and comprising in integral conjunction, a divergingly extending inner wall portion, a reentrantly looped over outer end portion, forming the termination of said inner wall portion, an intermediate wall portion inclined angularly outward from said end portion, a panel engaging portion extending angularly inward from said intermediate wall portion, an inwardly recessed detent portion formed at the innermost extension of said panel engaging portion, and a stop portion turned outwardly from said detent portion and lying transversely of the longitudinal axis of said casing; and an annular spring member mounted through the loops formed by said finger members and disposed between said inner and intermediate wall portions thereof to resiliently maintain said intermediate wall, panel engaging, detent and stop portions of said fingers in spaced relation outwardly of said inner wall and said casing to promote resilient gripping action of said fingers upon insertion into the aperture of the supporting panel.

3. In a bulb socket of the class described for ready inserted attachment and withdrawal from an aperture formed in a supporting mounting panel or the like, the combination comprising, a substantially cylindrical metal casing having a bulb receiving open end and a partially enclosed opposite end, a plurality of symmetrically spaced resilient snap-in fingers formed about the open end of said casing and diverging outwardly therefrom, said fingers each being looped reentrantly over and directed toward the said partially closed end of said casing and terminating at its free end in a planar stop section which is directed outwardly in transverse relation to said casing's longitudinal axis; an annular spring member mounted through the loop formation of said snap-in fingers and maintained in concentric radially spaced relation relative to said casing for supporting the looped over portion of said fingers in radial spaced disposition outwardly of said casing whereby said spring and resilient fingers cooperate resiliently to secure said socket assembly in the mounting panel aperture and the said stop sections of said fingers serve to limit the insertion of said assembly thereinto.

4. A socket assembly of the class described for detachable insertion in a mounting panel aperture, comprising in combination, a tubular metal socket casing having one open end for the axial reception therein of the socket end of a light bulb, means formed in the side walls of said casing for locking engagement with the said socket end of said light bulb, means disposed adjacent the open end of said casing for resiliently locking the same in the mounting panel aperture, comprising, a plurality of symmetrically spaced, resilient snap-in fingers, each of which is an integral extension of said casing and each of which is reentrantly turned backwardly and outwardly of the walls of said casing to form an open center loop having a panel engaging, recessed detent portion formed, at its rearward reaches, and an outwardly turned stop portion, disposed transversely of said casing's longitudinal axis and comprising the freely movable end thereof; an annular spring member mounted through the open center loops of said fingers for maintaining said stop and detent portions thereof in spaced relation outwardly of said casing, and a pliant dust cap member concentrically surrounding said tubular casing and the outer ends of said stop portions of said fingers whereby a dust tight seal is provided between the mounting panel and said cap's leading edge when said socket assembly is inserted into the mounting panel aperture a distance sufficient to bring said stop portions abuttingly against an adjacent face of said panel and permit said detents resiliently to engage the periphery of the mounting panel aperture to lock said socket assembly therein.

HAROLD H. CLAYTON.
ARLO D. SATTERTHWAITE.

References Cited in the file of this patent

UNITED STATES PATENTS

| Number | Name | Date |
|---|---|---|
| 711,670 | McGill | Oct. 21, 1902 |
| 1,987,035 | Tideman | Jan. 8, 1935 |
| 2,208,437 | Stearns | July 16, 1940 |
| 2,314,751 | Woodward | Mar. 23, 1943 |